(12) United States Patent
Ogawa

(10) Patent No.: US 11,303,324 B2
(45) Date of Patent: Apr. 12, 2022

(54) RADIO TRANSMISSION APPARATUS, TRANSMISSION SYSTEM, TRANSMISSION METHOD, AND NON-TRANSITORY COMPUTER READABLE MEDIUM STORING PROGRAM

(71) Applicant: NEC CORPORATION, Tokyo (JP)

(72) Inventor: Takatoshi Ogawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/055,778

(22) PCT Filed: Apr. 26, 2019

(86) PCT No.: PCT/JP2019/017851
§ 371 (c)(1),
(2) Date: Nov. 16, 2020

(87) PCT Pub. No.: WO2019/220928
PCT Pub. Date: Nov. 21, 2019

(65) Prior Publication Data
US 2021/0242902 A1  Aug. 5, 2021

(30) Foreign Application Priority Data

May 17, 2018  (JP) .............................. JP2018-095730

(51) Int. Cl.
*H04L 29/14* (2006.01)
*H04B 1/74* (2006.01)
(Continued)

(52) U.S. Cl.
CPC .............. *H04B 1/74* (2013.01); *H04B 7/155* (2013.01); *H04W 24/04* (2013.01)

(58) Field of Classification Search
CPC ......... H04B 1/74; H04B 7/155; H04W 24/04; H04L 29/14
See application file for complete search history.

(56) References Cited

U.S. PATENT DOCUMENTS

| 2015/0145979 A1* | 5/2015 | Tashiro | ............... H04L 65/4076 |
| | | | 348/65 |
| 2016/0325626 A1* | 11/2016 | Honda | .................... B60L 58/21 |
| 2017/0317700 A1* | 11/2017 | Ueki | .................... H04B 17/345 |

FOREIGN PATENT DOCUMENTS

| JP | 2013-118560 A | 6/2013 |
| JP | 2014-022811 A | 2/2014 |

(Continued)

OTHER PUBLICATIONS

International Search Report of PCT/JP2019/017851 dated Jul. 9, 2019 [PCT/ISA/210].

*Primary Examiner* — Lan-Huong Truong
(74) *Attorney, Agent, or Firm* — Sughrue Mion, PLLC

(57) ABSTRACT

A radio transmission apparatus (1) includes: a radio communication unit (2) that performs radio communication by a first radio communication scheme; a radio communication unit (3) that performs radio communication by a second radio communication scheme; an abnormality determination unit (4) that determines whether an abnormality has occurred in the radio communication performed by the radio communication unit (2); and a control unit (5) that controls transmission and reception of management information about the radio transmission apparatus (1) using the radio communication unit (2) or (3). When an abnormality has occurred in the radio communication performed by the radio communication unit (2), the control unit (5) performs control so that the management information is transmitted and received to and from a predetermined apparatus by using the radio communication unit (3).

8 Claims, 6 Drawing Sheets

(51) Int. Cl.
*H04B 7/155* (2006.01)
*H04W 24/04* (2009.01)

(56) References Cited

FOREIGN PATENT DOCUMENTS

| | | | |
|---|---|---|---|
| JP | 2014-053750 | A | 3/2014 |
| JP | 6238500 | B1 | 11/2017 |

* cited by examiner

RADIO TRANSMISSION APPARATUS, TRANSMISSION SYSTEM, TRANSMISSION METHOD, AND NON-TRANSITORY COMPUTER READABLE MEDIUM STORING PROGRAM

CROSS REFERENCE TO RELATED APPLICATIONS

This application is a National Stage of International Application No. PCT/JP2019/017851, filed Apr. 26, 2019, claiming priority to Japanese Patent Application No. 2018-095730, filed May 17, 2018, the contents of all of which are incorporated herein by reference in their entirety.

TECHNICAL FIELD

The present disclosure relates to a radio transmission apparatus, a transmission system, a transmission method, and a program.

BACKGROUND ART

In a transmission apparatus that performs desired data communication with another transmission apparatus, management information such as setting information, control information, and state information of the transmission apparatus may be transmitted using a part of a transmission path for data communication. When this transmission path is a wired transmission path, the transmitting-side and the receiving-side apparatuses are physically connected to each other, so that the connectivity thereof is ensured. However, when this transmission path is a wireless transmission path as in the case of a fixed radio transmission apparatus or the like, the transmitting-side and the receiving-side apparatuses are not physically connected to each other, so that, unlike in the case of a wired transmission path, the connectivity thereof is not ensured. Further, in recent years, network monitoring and control using Software Defined Network (SDN) technology performed by multiple vendors have become more sophisticated, and a connection parameter mismatch of a device due to misconfiguration or the like and a temporary line failure may occur. Consequently, there is a possibility that the connectivity of the transmission line cannot be secured.

For example, Patent Literature 1 discloses a transmission method in the event of a line failure. Patent Literature 1 discloses that when an abnormality has occurred in a mobile communication line of a device of a certain group, information is transmitted using a mobile communication line of a device of a group that is different from and adjacent to the certain group by performing information relay using Low Power Wide Area (LPWA) communication.

CITATION LIST

Patent Literature

Patent Literature 1: Japanese Patent No. 6238500

SUMMARY OF INVENTION

Technical Problem

In the technique disclosed in Patent Literature 1, after transmission of information from a first group to an adjacent second group, transmission of information is also performed in the second group through a mobile communication line similar to that of the first group. When an abnormality has occurred in the mobile communication line of the first group, there is a possibility that an abnormality similar to this abnormality has also occurred in the second group that uses the mobile communication line similar to that of the first group. Consequently, even if management information of a transmission apparatus is transmitted using the technique disclosed in Patent Literature 1, it is still difficult to ensure transmission of the management information of the transmission apparatus. Therefore, one of the objects to be attained by an example embodiment disclosed herein is to provide a radio transmission apparatus, a transmission system, a transmission method, and a program that are capable of reliably transmitting management information of the radio transmission apparatus.

Solution to Problem

A radio transmission apparatus according to a first aspect includes: first radio communication means for performing radio communication by a first radio communication scheme; second radio communication means for performing radio communication by a second radio communication scheme; abnormality determination means for determining whether an abnormality has occurred in the radio communication performed by the first radio communication means; and control means for controlling transmission and reception of management information about the radio transmission apparatus using the first radio communication means or the second radio communication means, in which when the abnormality determination means determines that an abnormality has occurred in the radio communication performed by the first radio communication means, the control means performs control so that the management information is transmitted and received to and from a predetermined apparatus by using the second radio communication means, and the predetermined apparatus is a management apparatus configured to remotely manage the radio transmission apparatus, or a relay apparatus configured to relay transmission and reception of the management information between the radio transmission apparatus and the management apparatus by a communication scheme other than the first radio communication scheme.

A transmission system according to a second aspect includes: a radio transmission apparatus; and a management apparatus configured to remotely managing the radio transmission apparatus, in which the radio transmission apparatus includes: first radio communication means for performing radio communication by a first radio communication scheme; second radio communication means for performing radio communication by a second radio communication scheme; abnormality determination means for determining whether an abnormality has occurred in the radio communication performed by the first radio communication means; and control means for controlling transmission and reception of management information about the radio transmission apparatus using the first radio communication means or the second radio communication means, and when the abnormality determination means determines that an abnormality has occurred in the radio communication performed by the first radio communication means, the control means performs control so that the management information is transmitted and received by using the second radio communication means, and the radio transmission apparatus and the management apparatus transmit and receive the management information to and from each other without performing communication by the first radio communication scheme.

A transmission method according to a third aspect includes: determining, in a radio transmission apparatus including first radio communication means for performing radio communication by a first radio communication scheme and second radio communication means for performing radio communication by a second radio communication scheme, whether an abnormality has occurred in the radio communication performed by the first radio communication means; and performing control so that management information about the radio transmission apparatus is transmitted and received to and from a predetermined apparatus by using the second radio communication means when it is determined that an abnormality has occurred in the radio communication performed by the first radio communication means, in which the predetermined apparatus is a management apparatus configured to remotely manage the radio transmission apparatus, or a relay apparatus configured to relay transmission and reception of the management information between the radio transmission apparatus and the management apparatus by a communication scheme other than the first radio communication scheme.

A program according to a fourth aspect causes a computer of a radio transmission apparatus including first radio communication means for performing radio communication by a first radio communication scheme and second radio communication means for performing radio communication by a second radio communication scheme to execute: an abnormality determination step of determining whether an abnormality has occurred in the radio communication performed by the first radio communication means; and a control step of controlling transmission and reception of management information about the radio transmission apparatus using the first radio communication means or the second radio communication means, in which in the control step, when it is determined in the abnormality determination step that an abnormality has occurred in the radio communication performed by the first radio communication means, control is performed so that management information about the radio transmission apparatus is transmitted and received to and from a predetermined apparatus by using the second radio communication means, and the predetermined apparatus is a management apparatus configured to remotely manage the radio transmission apparatus, or a relay apparatus configured to relay transmission and reception of the management information between the radio transmission apparatus and the management apparatus by a communication scheme other than the first radio communication scheme.

Advantageous Effects of Invention

According to the above-described aspects, it is possible to provide a radio transmission apparatus, a transmission system, a transmission method, and a program that are capable of reliably transmitting management information of the radio transmission apparatus.

DESCRIPTION OF EMBODIMENTS

Outline of Example Embodiment

Figure 1:
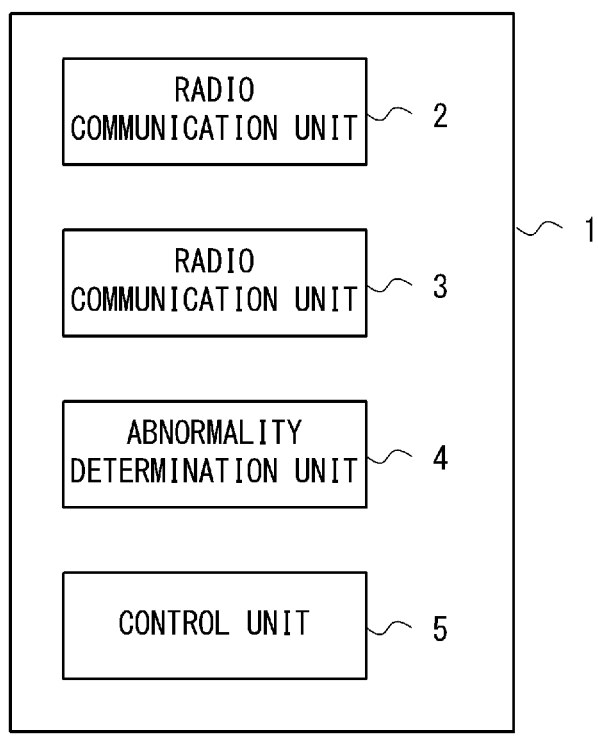
FIG. 1 is a block diagram showing an example of a configuration of a radio transmission apparatus according to an outline of an example embodiment.

Prior to describing an example embodiment in detail, an outline of the example embodiment is given. FIG. 1 is a block diagram showing an example of a configuration of a radio transmission apparatus 1 according to the outline of the example embodiment. As shown in FIG. 1, the radio transmission apparatus 1 includes a radio communication unit 2, a radio communication unit 3, an abnormality determination unit 4, and a control unit 5.

The radio communication unit 2 performs radio communication by a first radio communication scheme. Further, the radio communication unit 3 performs radio communication by a second radio communication scheme. As described above, the radio transmission apparatus 1 is an apparatus capable of performing radio communication by at least two different radio communication schemes. Here, the second radio communication scheme is, for example, a radio communication scheme having a wider communication range than that of the first radio communication scheme, but it is not limited to such a radio communication scheme.

The abnormality determination unit 4 determines whether an abnormality has occurred in radio communication performed by the radio communication unit 2. Note that as well as determining whether an abnormality has occurred in radio communication performed by the radio communication unit 2, the abnormality determination unit 4 may determine whether an abnormality has occurred in radio communication performed by the radio communication unit 3.

The control unit 5 controls transmission and reception of management information about the radio transmission apparatus 1 using the radio communication unit 2 or the radio communication unit 3. That is, the radio transmission apparatus 1 can transmit management information using the radio communication unit 2. Similarly, the radio transmission apparatus 1 can transmit management information using the radio communication unit 3.

It should be noted that when the abnormality determination unit 4 determines that an abnormality has occurred in the radio communication performed by the radio communication unit 2, the control unit 5 performs control so that management information is transmitted and received to and from a predetermined apparatus by using the radio communication unit 3. The predetermined apparatus may be a management apparatus that remotely manages the radio transmission apparatus 1, or a relay apparatus that relays transmission and reception of management information between the radio transmission apparatus 1 and the management apparatus by a communication scheme other than the first radio communication scheme.

As described above, when an abnormality has occurred in radio communication by the first radio communication scheme, the radio transmission apparatus 1 transmits and receives management information to and from the management apparatus by the second radio communication scheme or to and from the relay apparatus that performs relaying without using the first radio communication scheme. Therefore, when the transmission path using the first radio scheme cannot be properly established, management information is transmitted without using the first radio communication scheme. Thus, it is possible to reliably transmit management information of the radio transmission apparatus 1

Details of Example Embodiment

Figure 2:
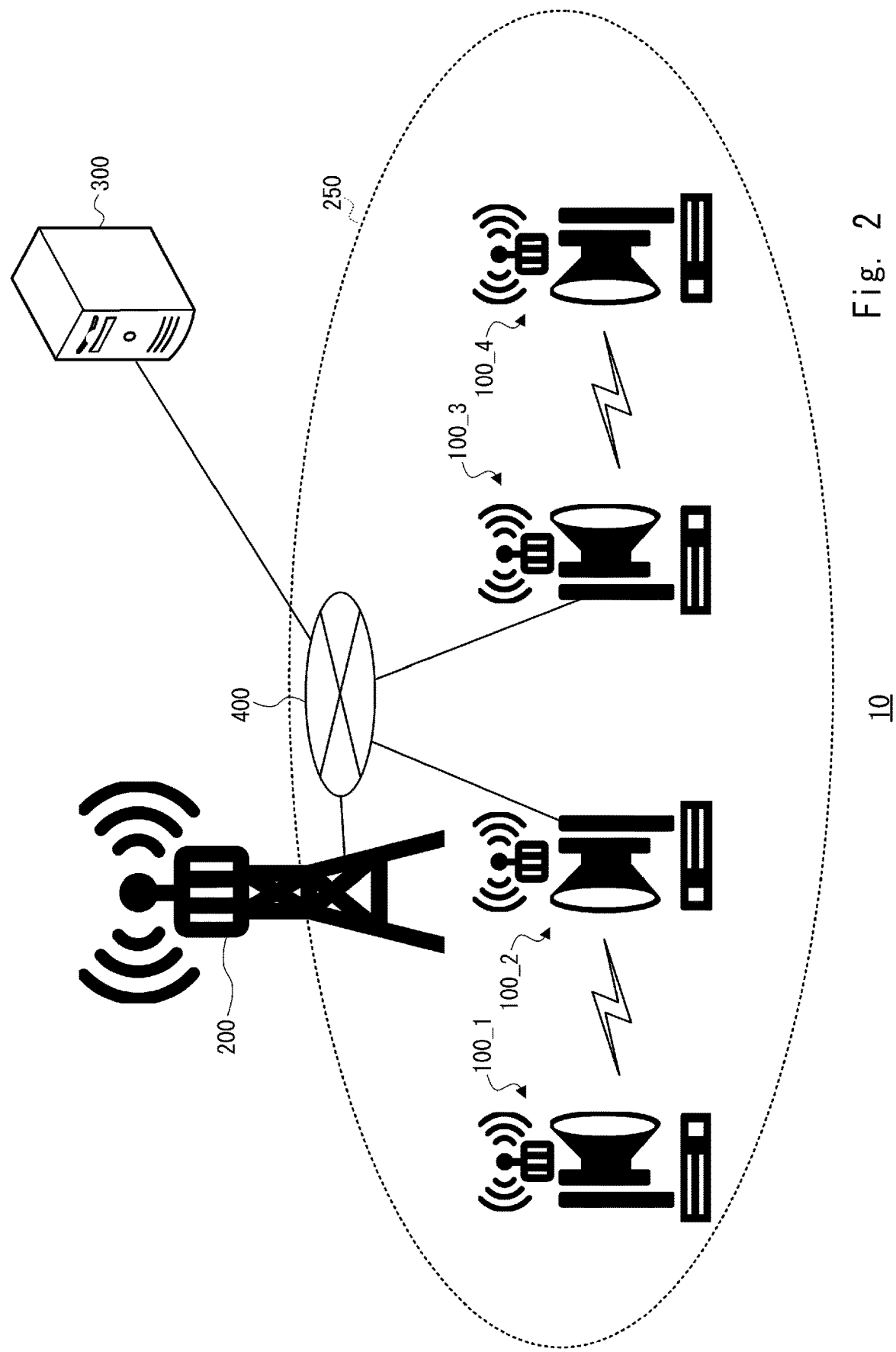
FIG. 2 is a schematic diagram showing an example of a configuration of a transmission system according to the example embodiment.

Next, details of the example embodiment are described. FIG. 2 is a schematic diagram showing an example of a configuration of a transmission system 10 according to the example embodiment. In the example shown in FIG. 2, the transmission system 10 includes a fixed radio transmission apparatus 100_1, a fixed radio transmission apparatus 100_2, a fixed radio transmission apparatus 100_3, a fixed radio transmission apparatus 100_4, an LPWA base station 200, and a management apparatus 300. In the following description, any of the fixed radio transmission apparatuses 100_1, 100_2, 100_3, and 100_4 is referred to as the fixed radio transmission apparatus 100 when a specific fixed radio transmission apparatus is not being referred to.

Note that the configuration shown in FIG. 2 is merely an example. The example in FIG. 2 shows the four fixed radio transmission apparatuses 100_1, 100_2, 100_3, and 100_4, but the transmission system 10 may include any number of fixed radio transmission apparatuses 100.

The fixed radio transmission apparatus 100 is an apparatus that performs point-to-point communication with another fixed radio transmission apparatus 100. In the example shown in FIG. 2, the fixed radio transmission apparatuses 100_1 and 100_2 perform one-to-one communication, and the fixed radio transmission apparatuses 100_3 and 100_4 perform one-to-one communication. The fixed radio transmission apparatus 100 is, for example, a high-speed fixed radio transmission apparatus used in a backhaul of a mobile communication network, a telephone network, or the like. However, the fixed radio transmission apparatus 100 may be an apparatus used for other purposes. For example, the fixed radio transmission apparatus 100 may be an apparatus used as an alternative to a common wired transmission path (e.g., an Ethernet (registered trademark) line). In addition to communicating with another fixed radio transmission apparatus 100, the fixed radio transmission apparatus 100 can perform LPWA communication with the LPWA base station 200. In the following description, a transmission path through which the fixed radio transmission apparatus 100 performs point-to-point communication with another fixed radio transmission apparatuses 100 is referred to as a main transmission path, and a transmission path through which the fixed radio transmission apparatus 100 performs LPWA communication is referred to as an LPWA transmission path. In this example embodiment, the main transmission path provides faster communication than that in the LPWA transmission path. Note that details of the fixed radio transmission apparatus 100 will be described later with reference to FIG. 3.

At least one of the fixed radio transmission apparatuses 100 included in the transmission system 10 is connected to a network 400 for transmitting and receiving data to and from the management apparatus 300. Note that in the example shown in FIG. 2, the fixed radio transmission apparatuses 100_2 and 100_3 are connected to the network 400 through a wire.

The LPWA base station 200 is a base station that performs point-to-multipoint LPWA communication with the fixed radio transmission apparatuses 100 in a radio wave coverage area 250 (a broken-line area in FIG. 2) of LPWA communication. The LPWA base station 200 is also connected through a wire to the network 400 for transmitting and receiving data to and from the management apparatus 300. Thus, the LPWA base station 200 is an example of a relay apparatus that relays transmission and reception of management information between the fixed radio transmission apparatus 100 and the management apparatus 300 by a communication scheme other than the radio communication scheme used in the main transmission path.

The management apparatus 300 is an apparatus that remotely manages the fixed radio transmission apparatus 100. The management apparatus 300 is connected to the network 400 and transmits and receives management information of the fixed radio transmission apparatus 100 to and from the fixed radio transmission apparatus 100. Here, the management information is any information required for the management of the fixed radio transmission apparatus 100. For example, the management information may include setting information for setting the fixed radio transmission apparatus 100. Further, the management information may also include control information for controlling the fixed radio transmission apparatus 100. Further, the management information may include state information indicating states of the fixed radio transmission apparatus 100 such as a setting state, a control state, and an operation state. The management information is, for example, information about the main transmission path of the fixed radio transmission apparatus 100, but may also include information about the LPWA transmission path or may also include information about any components of the fixed radio transmission apparatus 100.

The management information may be, for example, information for setting a frequency, a bandwidth, a modulation scheme, a Virtual LAN (VLAN), a communication path, and the like used in radio communication. Further, the management information may be, for example, information indicating the presence or absence of an abnormality, or a state value (e.g., a current set value, a current state value, a reception level of radio waves, and temperatures of the components) of each monitoring item. The state value may be, for example, a current set value of each component of the fixed radio transmission apparatus 100 or a current state value (e.g., a reception level of radio waves and temperatures of the components) of each component thereof. Further, the management information may be a value indicating the presence or absence of an abnormality of each monitoring item or a value indicating the presence or absence of an abnormality of the entire monitoring target. Note that these are merely examples of the contents of management information, and the contents of the management information are not limited thereto.

Figure 3:
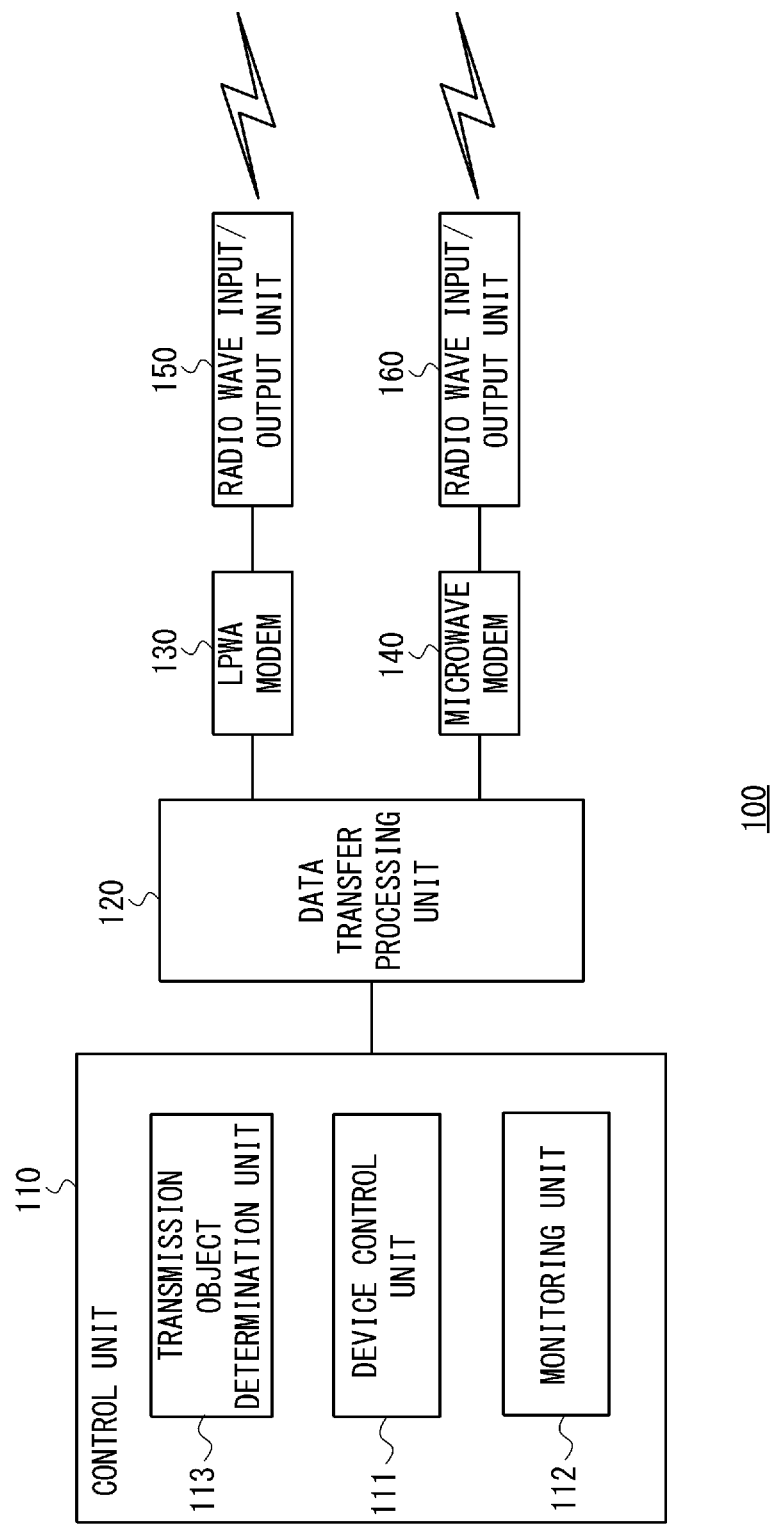
FIG. 3 is a block diagram showing an example of a configuration of a fixed radio transmission apparatus according to the example embodiment.

Next, the fixed radio transmission apparatus 100 is described in detail. FIG. 3 is a block diagram showing an example of a configuration of the fixed radio transmission apparatus 100. As shown in FIG. 3, the fixed radio transmission apparatus 100 includes a control unit 110, a data transfer processing unit 120, an LPWA modem 130, a microwave modem 140, a radio wave input/output unit 150, and a radio wave input/output unit 160.

The control unit 110 includes a device control unit 111, a monitoring unit 112, and a transmission object determination unit 113.

The device control unit 111 controls the fixed radio transmission apparatus 100. The device control unit 111 performs setting and control for performing transmission through the main transmission path based on, for example, setting information and control information received as management information from the management apparatus 300. Note that the device control unit 111 may perform not only setting and control related to the main transmission path, but also setting and control related to the LPWA transmission path or any other components of the fixed radio transmission apparatus 100.

Further, the device control unit 111 corresponds to the control unit 5 shown in FIG. 1 and controls transmission and reception of management information using the main transmission path or the LPWA transmission path. When the main transmission path is in a normal state, that is, when the monitoring unit 112, which will be described later, does not determine that an abnormality has occurred in the radio communication through the main transmission path, the device control unit 111 performs control so that management information is transmitted and received to and from a predetermined apparatus by using the main transmission path. Further, when the monitoring unit 112 determines that an abnormality has occurred in the radio communication through the main transmission path, the device control unit 111 performs control so that management information is transmitted and received to and from the predetermined apparatus by using the LPWA transmission path. In this example embodiment, the predetermined apparatus is the LPWA base station 200. Note that in this example embodiment, management information is transmitted, for example, between the management apparatus 300 and the fixed radio transmission apparatus 100 using the LPWA base station 200 as a relay apparatus as described above, but management information may be directly transmitted by the management apparatus 300 and the fixed radio transmission apparatus 100 through LPWA communication.

The monitoring unit 112 monitors the fixed radio transmission apparatus 100. The monitoring unit 112 monitors various kinds of states of the fixed radio transmission apparatus 100 such as a setting state, a control state, and an operation state. In order to monitor these states, the monitoring unit 112 collects state information (state values) from the devices constituting the fixed radio transmission apparatus 100. For example, the monitoring unit 112 acquires state information from the data transfer processing unit 120, the LPWA modem 130, the microwave modem 140, the radio wave input/output units 150 and 160, or other components (not shown) of the fixed radio transmission apparatus 100. Each of the state information pieces collected by the monitoring unit 112 is a candidate for the management information to be transmitted to the management apparatus 300. Note that in this example embodiment, when the device control unit 111 transmits management information using the LPWA transmission path, it transmits, to the management apparatus 300, the management information determined to be a transmission object (i.e., an object to be transmitted) by the transmission object determination unit 113, which will be described later, among the management information pieces collected by the monitoring unit 112.

Further, the monitoring unit 112 corresponds to the abnormality determination unit 4 shown in FIG. 1, and determines whether an abnormality has occurred in the radio communication through the main transmission path. For example, the monitoring unit 112 determines whether an abnormality has occurred in the radio communication through the main transmission path based on state values of predetermined monitoring items output from the microwave modem 140.

The transmission object determination unit 113 determines the management information obtained by summarizing a plurality of management information pieces or selected from among a plurality of management information pieces in accordance with a predetermined rule to be management information to be transmitted through the LPWA transmission path. An example as to how the transmission object determination unit 113 determines an object to be transmitted will be described with reference to the drawings.

Figure 4:
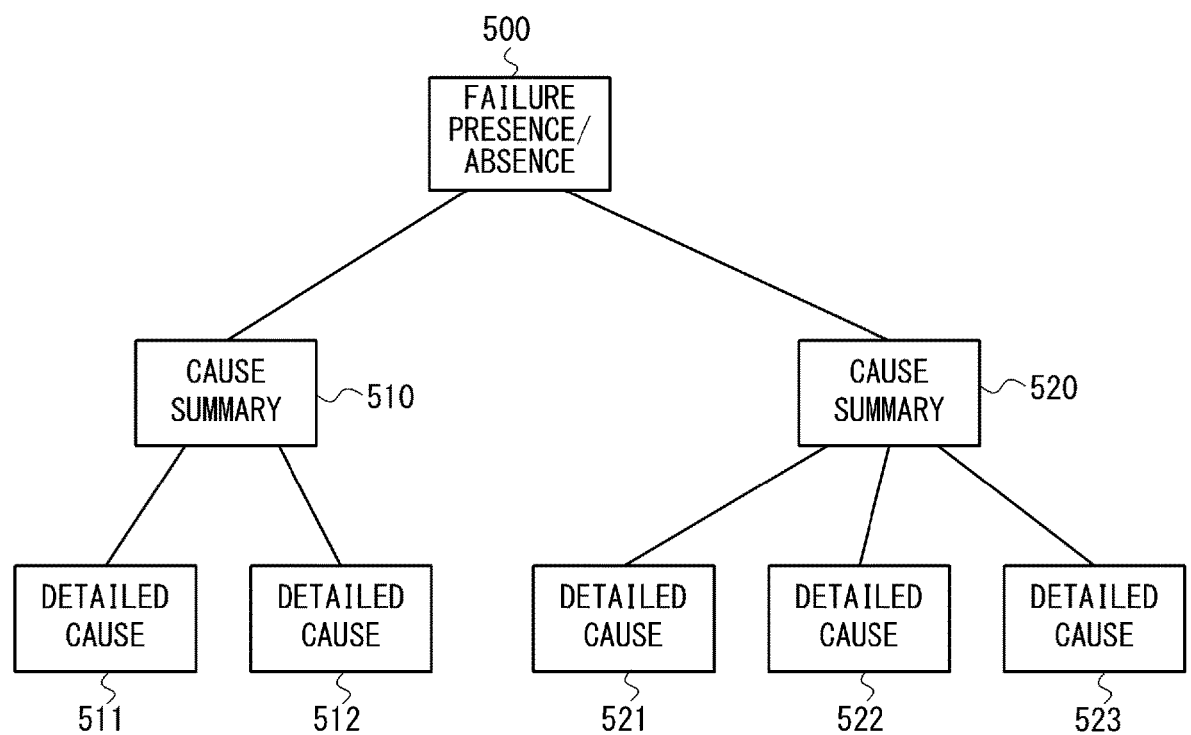
FIG. 4 is a schematic diagram showing an example of a relation among a plurality of state information pieces that can be transmitted as management information.

FIG. 4 is a schematic diagram showing an example of a relation among a plurality of state information pieces that can be transmitted as management information. In the example shown in FIG. 4, detailed cause information 511, detailed cause information 512, detailed cause information 521, detailed cause information 522, and detailed cause information 523 are shown as state information pieces of a subordinate concept. Each of these information pieces is information indicating a cause of the failure that has occurred in the fixed radio transmission apparatus 100. For example, each of these information pieces is state information of a monitoring item. Specifically, each of these information pieces may be, for example, information indicating the presence or absence of an abnormality in the temperature of a component or information indicating the presence or absence of an abnormality in voltage of a component. When the monitoring items are temperatures of components X and Y, and voltages of the components X and Y and a component Z, the detailed cause information pieces are, for example, the following information pieces. For example, the detailed cause information 511 is state information indicating the presence or absence of an abnormality in the temperature of the component X, and the detailed cause information 512 is state information indicating the presence or absence of an abnormality in the temperature of the component Y. Further, for example, the detailed cause information 521 is state information indicating the presence or absence of an abnormality in the voltage of the component X, the detailed cause information 522 is state information indicating the presence or absence of an abnormality in the voltage of the component Y, and the detailed cause information 523 is state information indicating the presence or absence of an abnormality in the voltage of the component Z. Note that in the example described here, the detailed cause information is information indicating the presence or absence of an abnormality in a value detected by a sensor, but the detailed cause information may instead be the value itself detected by the sensor.

Further, in the example shown in FIG. 4, cause summary information 510 and cause summary information 520 are shown as state information pieces of a superordinate concept obtained by summarizing detailed cause information pieces, which are state information pieces of a subordinate concept, from a predetermined point of view. The cause summary information 510 is information summarizing pieces of the detailed cause information 511 and 512, and the cause summary information 520 is information summarizing pieces of the detailed cause information 521, 522, and 523. For example, the cause summary information 510 is information indicating whether an abnormality in temperature has occurred in any component, and the cause summary information 520 is information indicating whether an abnormality in voltage has occurred in any component.

Further, in the example shown in FIG. 4, failure presence/absence information 500 is shown as state information of a superordinate concept obtained by summarizing cause summary information pieces, which are state information pieces of a subordinate concept, from a predetermined point of view. The failure presence/absence information 500 is information summarizing pieces of the cause summary information 510 and 520. For example, the failure presence/absence information 500 is information indicating whether any failure (abnormality) has occurred in a device including the components X and Y.

In this way, the transmission object determination unit 113 generates, based on a plurality of state information pieces of a subordinate concept, state information of a superordinate concept summarizing the plurality of state information pieces of a subordinate concept. Then, the transmission object determination unit 113 determines the generated state information of a superordinate concept to be an object to be transmitted at the time of LPWA communication. That is, when LPWA communication is performed, not all of the pieces of the detailed cause information 511, 512, 521, 522 and 523 are transmitted, and instead only the state information of a superordinate concept of these pieces of the state information is transmitted. For example, the transmission object determination unit 113 may determine the failure presence/absence information 500 to be an object to be transmitted, the cause summary information 510 to be an object to be transmitted, or the cause summary information 520 to be an object to be transmitted.

A specific example of a case in which the transmission object determination unit 113 determines, as an object to be transmitted, information obtained by summarizing the information pieces has been described above. However, as mentioned above, the transmission object determination unit 113 may instead determine, as an object to be transmitted, information selected from among the information pieces. For example, the transmission object determination unit 113 selects only the detailed cause information indicating an abnormality from among all the detailed cause information pieces as an object to be transmitted. Further, the transmission object determination unit 113 may select the failure presence/absence information, the cause summary information, and the detailed cause information in combination. In this case, information may be selected in order from a superordinate concept to a subordinate concept. For example, the transmission object determination unit 113 may first select the failure presence/absence information 500 as an object to be transmitted and transmit it, next select the cause summary information 520 as an object to be transmitted in accordance with a predetermined selection rule and transmit it, and then select the detailed cause information 522 as an object to be transmitted in accordance with the predetermined selection rule.

Note that any predetermined selection rule can be used as the selection rule used by the transmission object determination unit 113. Further, the transmission object determination unit 113 may select an object to be transmitted in response to an instruction from the management apparatus 300.

As described above, at the time of LPWA communication, only the object to be transmitted determined by summarizing processing or selection processing performed by the transmission object determination unit 113 is transmitted. Thus, it is possible to reduce the amount of transmission data as compared to the case in which all management information pieces are transmitted. LPWA communication is characterized by a low communication speed. However, in this example embodiment, as the transmission object determination unit 113 determines an object to be transmitted, the amount of transmission data can be set to the amount of data suitable for LPWA communication.

Figure 5:
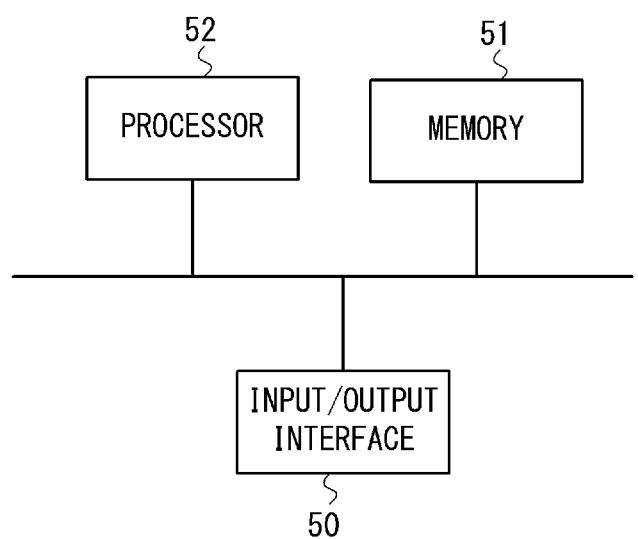
FIG. 5 is a block diagram showing an example of a hardware configuration of a control unit.

An example of a hardware configuration of the control unit 110 is described below. FIG. 5 is a block diagram showing an example of the hardware configuration of the control unit 110. As shown in FIG. 5, the control unit 110 includes, for example, an input/output interface 50, a memory 51, and a processor 52.

The input/output interface 50 is an interface circuit for inputting and outputting data between the control unit 110 and the data transfer processing unit 120.

The memory 51 is composed of, for example, a combination of a volatile memory and a non-volatile memory. The memory 51 is used to store software (a computer program) including at least one instruction executed by the processor 52.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The programs may be provided to a computer using any type of transitory computer readable media. Examples of transitory computer readable media include electric signals, optical signals, and electromagnetic waves. Transitory computer readable media can provide the programs to a computer via a wired communication line (e.g., electric wires, and optical fibers) or a wireless communication line.

The processor 52 loads the software (the computer program) from the memory 51 and executes the loaded software, thereby performing the above-described processing of the device control unit 111, the monitoring unit 112, and the transmission object determination unit 113. As described above, the control unit 110 functions as a computer. The processor 52 may be, for example, a microprocessor, a Micro Processor Unit (MPU), or a Central Processing Unit (CPU). The processor 52 may include a plurality of processors.

Next, the configuration of the fixed radio transmission apparatus 100 shown in FIG. 3 other than the control unit 110 is described.

The data transfer processing unit 120 performs switching between the main transmission path and the LPWA transmission path to perform transmission. Specifically, the data transfer processing unit 120 is a network switch such as a layer 2 (L2) switch. The data transfer processing unit 120 transmits management information through a transmission path specified by the device control unit 111, which is either the main transmission path or the LPWA transmission path. For example, the data transfer processing unit 120 outputs the management information to be transmitted to the LPWA modem 130 when the management information is transmitted through the LPWA transmission path, while it outputs the management information to be transmitted to the microwave modem 140 when the management information is transmitted through the main transmission path.

The LPWA modem 130 and the radio wave input/output unit 150 are circuits for constructing the LPWA transmission path, and the microwave modem 140 and the radio wave input/output unit 160 are circuits for constructing the main transmission path. It should be noted that the main transmission path is a transmission path that provides Fixed Wireless Access (FWA) communication. The main transmission path is a transmission path defined by a predetermined point-to-point radio communication scheme using microwaves. Each of the microwave modem 140 and the radio wave input/output unit 160 corresponds to the radio communication unit 2 shown in FIG. 1, and performs radio communication (radio communication by a first radio communication scheme) by FWA. Each of the LPWA modem 130 and the radio wave input/output unit 150 corresponds to the radio communication unit 3 shown in FIG. 1, and performs radio communication (radio communication by a second radio communication scheme) by LPWA. FWA communication enables higher speed transmission than that in LPWA communication. Note that in this example embodiment, as the LPWA communication is used as the second radio communication scheme, the communication range thereof is wider than that of the first radio communication scheme. Further, in this example embodiment, as the LPWA communication is used as the second radio communication scheme, point-to-multipoint communication can be performed among the LPWA base station 200 and a plurality of fixed radio transmission apparatuses 100.

The LPWA modem 130 performs modulation and demodulation in accordance with the LPWA transmission path. The microwave modem 140 performs modulation and demodulation in accordance with the main transmission path.

The radio wave input/output unit 150 is an interface circuit for transmitting and receiving radio waves to and from the LPWA base station 200, and includes, for example, an antenna. The radio wave input/output unit 150 transmits a signal output from the LPWA modem 130. Further, the radio wave input/output unit 150 outputs the received signal to the LPWA modem 130. The radio wave input/output unit 160 is an interface circuit for transmitting and receiving radio waves to and from another fixed radio transmission apparatus 100, and includes, for example, an antenna. The radio wave input/output unit 160 transmits the signal output from the microwave modem 140 to space. Further, the radio wave input/output unit 160 outputs the signal received from the space to the microwave modem 140.

Note that as the FWA communication and the LPWA communication used in this example embodiment, any known communication technology (communication standards) can be employed. In particular, the LPWA used in this example embodiment may be an LPWA using a unique network or an LPWA using a mobile phone network. Examples of the LPWA using a unique network include Long Range Wide Area Network (LoRaWAN) (registered trademark), SigFox (registered trademark), and Wi-Fi HaLow (IEEE 802.11ah). Note that LPWAs other than those described above that use a unique network, which are implemented in accordance with a unique protocol or the like, may be employed in this example embodiment. Further, examples of the LPWA using a mobile telephone network include 3GPP LTE-M and 3GPP NB-IOT, but the LPWA is not limited to these.

As described above, in this example embodiment, LPWA communication is used as the second radio communication scheme. That is, the radio communication scheme having a wider communication range than that of the first radio communication scheme (FWA communication) is used as the second radio communication scheme. Thus, in this case, the fixed radio transmission apparatus 100 can transmit and receive management information to and from an apparatus on the other end of transmission located at a place farther away from the fixed radio transmission apparatus 100 than in the case in which management information is transmitted by the first radio communication scheme. For example, in the arrangement of the apparatuses shown in FIG. 2, it is assumed that a failure has occurred in the FWA communication between the fixed radio transmission apparatuses 100_3 and 100_4. Even in this case, the fixed radio transmission apparatus 100_4 can transmit and receive management information to and from the LPWA base station 200 located at a position farther away from the fixed radio transmission apparatus 100_4 than a location of the position of the fixed radio transmission apparatus 100_3.

Further, the radio communication scheme in which point-to-multipoint communication is performed is used as the second radio communication scheme. Thus, it is possible to transmit and receive management information simultaneously with the plurality of fixed radio transmission apparatuses 100 as apparatuses on the other end of transmission. Further, in point-to-multipoint communication, setting and adjustment required for establishing communication are easier than those for establishing point-to-point FWA communication. Thus, management information can be easily transmitted.

Figure 6:
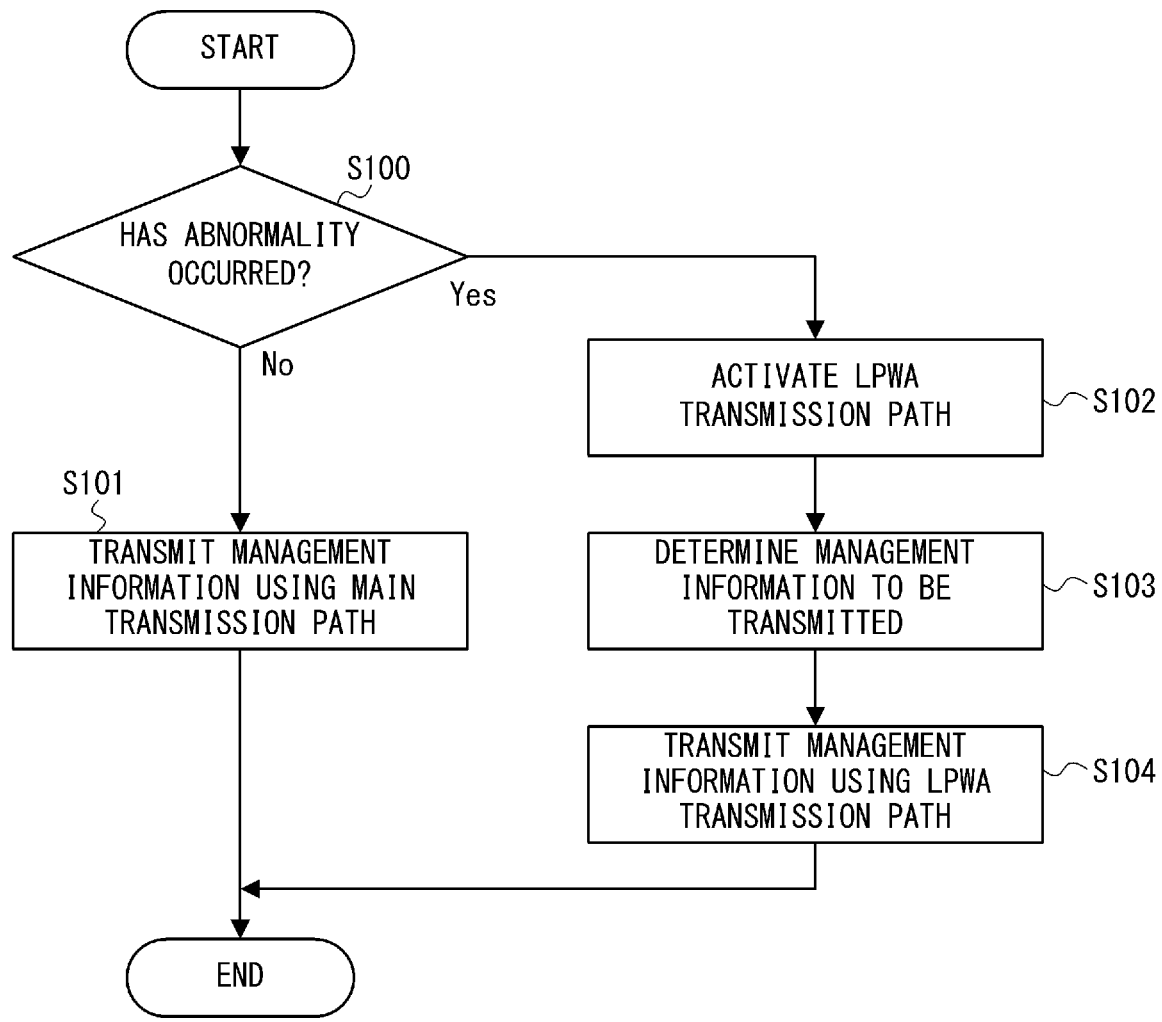
FIG. 6 is a flowchart showing an example of an operation for transmitting management information performed by the fixed radio transmission apparatus according to the example embodiment.

Next, an operation for transmitting management information performed by the fixed radio transmission apparatus 100 is described. FIG. 6 is a flowchart showing an example of the operation for transmitting management information performed by the fixed radio transmission apparatus 100. This operation is described below with reference to FIG. 6.

In Step 100 (S100), the monitoring unit 112 determines whether an abnormality has occurred in the radio communication through the main transmission path. If the monitoring unit 112 determines that no abnormality has occurred in the main transmission path (No in Step 100), the process proceeds to Step 101. On the other hand, if the monitoring unit 112 determines that an abnormality has occurred in the main transmission path (Yes in Step 100), the process proceeds to Step 102.

In Step 101 (S101), the device control unit 111 transmits management information using the main transmission path. At this time, the device control unit 111 transmits, for example, all the management information pieces to the management apparatus 300.

Meanwhile, if an abnormality has occurred in the main transmission path, the device control unit 111 transmits management information through the LPWA transmission path. Therefore, first, in Step 102 (S102), the device control unit 111 activates the LPWA transmission path. In this example embodiment, when the main transmission path is in a normal state, the LPWA transmission path is not used. Accordingly, when the main transmission path is in a normal state, the LPWA transmission path is in a deactivated state. Accordingly, for example, the power sources of the LPWA modem 130 and the radio wave input/output unit 150 are turned off. Thus, when an abnormality has occurred in the main transmission path, the LPWA transmission path is activated. Note that the LPWA transmission path may be always in an activated state, in which case Step 102 is omitted.

Next, in Step 103 (S103), the transmission object determination unit 113 determines, as described above, the management information to be transmitted through the LPWA transmission path.

Next, in Step 104 (S104), the device control unit 111 transmits the management information using the LPWA transmission path.

The example embodiment has been described above. In the transmission system 10, when an abnormality has occurred in the main transmission path of the fixed radio transmission apparatus 100, management information can be transmitted through the LPWA transmission path. Thus, it is possible to reliably transmit management information of the fixed radio transmission apparatus 100. For example, even when a failure has occurred in the FWA communication between the fixed radio transmission apparatuses 100_3 and 100_4 shown in FIG. 2, an operator can manage the fixed radio transmission apparatus 100_4 without going to the place where it is located.

Note that the present disclosure is not limited to the above-described example embodiment and can be modified as appropriate without departing from the spirit of the present disclosure. For example, in the above-described example embodiment, LPWA communication is performed only when an abnormality has occurred in the main transmission path, but management information may be transmitted by the LPWA communication even when the main transmission path is in a normal state.

Further, in the above-described example embodiment, transmission of management information through the main transmission path and transmission of management information through the LPWA transmission path are both performed through the same network 400, but may instead be performed through networks different from each other.

Further, in the above-described example embodiment, the fixed radio transmission apparatus 100 used in a backhaul of a mobile communication network or the like has been described as an example, but a radio transmission apparatus that covers a narrow area such as a WiFi base station may instead perform processing for transmitting management information similar to that performed in the fixed radio transmission apparatus 100. Note that a WiFi base station is an apparatus that is generally connected to an Internet line and provides Internet services. When management information of the WiFi base station is transmitted through an Internet network, security measures such as a Virtual Private Network (VPN) are required. However, as described in the above example embodiment, by transmitting management information of the WiFi base station through the LPWA transmission path, it is possible to securely perform monitoring and control through a unique radio network instead of through the Internet network.

Further, although an example in which LPWA communication is used has been described in the above-described embodiment, wide-area radio communication other than LPWA communication may be used. However, the LPWA communication is preferable, because a power consumption thereof is low, a coverage thereof is wide, the number of nodes that can simultaneously perform communication is large, and so on.

While the present disclosure has been described with reference to the example embodiment, the present disclosure is not limited to the aforementioned example embodiment. Various changes that can be understood by those skilled in the art can be made to the configurations and the details of the present disclosure within the scope of the present disclosure.

1 RADIO TRANSMISSION APPARATUS
2, 3 RADIO COMMUNICATION UNIT
4 ABNORMALITY DETERMINATION UNIT
5 CONTROL UNIT
10 TRANSMISSION SYSTEM
50 INPUT/OUTPUT INTERFACE
51 MEMORY
52 PROCESSOR
100 FIXED RADIO TRANSMISSION APPARATUS
110 CONTROL UNIT
111 DEVICE CONTROL UNIT
112 MONITORING UNIT
113 TRANSMISSION OBJECT DETERMINATION UNIT
120 DATA TRANSFER PROCESSING UNIT
130 LPWA MODEM
140 MICROWAVE MODEM
150, 160 RADIO WAVE INPUT/OUTPUT UNIT
200 LPWA BASE STATION
250 COVERAGE AREA
300 MANAGEMENT APPARATUS
400 NETWORK
500 FAILURE PRESENCE/ABSENCE INFORMATION
510, 520 CAUSE SUMMARY INFORMATION
511, 512, 521, 522, 523 DETAILED CAUSE INFORMATION

The invention claimed is:

1. A radio transmission apparatus comprising:
a first radio communication circuit configured to perform radio communication by a first radio communication scheme;
a second radio communication circuit configured to perform radio communication by a second radio communication scheme;
at least one memory storing program instructions; and
at least one processor configured to execute the instructions stored in the memory to:
determine whether an abnormality has occurred in the radio communication performed by the first radio communication circuit; and
control transmission and reception of management information about the radio transmission apparatus using the first radio communication circuit or the second radio communication circuit, wherein
the processor is further configured to execute the instructions to perform control so that the management information is transmitted and received to and from a predetermined apparatus by using the second radio communication circuit when it is determined that an abnormality has occurred in the radio communication performed by the first radio communication circuit, and
the predetermined apparatus is a management apparatus configured to remotely manage the radio transmission apparatus, or a relay apparatus configured to relay transmission and reception of the management information between the radio transmission apparatus and the management apparatus by a communication scheme other than the first radio communication scheme.

2. The radio transmission apparatus according to claim 1, wherein the second radio communication scheme is a radio communication scheme having a wider communication range than that of the first radio communication scheme.

3. The radio transmission apparatus according to claim 1, wherein
the first radio communication scheme is a radio communication scheme in which point-to-point communication is performed, and
the second radio communication scheme is a radio communication scheme in which point-to-multipoint communication is performed.

4. The radio transmission apparatus according to claim 1, wherein the second radio communication scheme is Low Power Wide Area (LPWA) communication.

5. The radio transmission apparatus according to claim 4, wherein the processor is further configured to execute the instructions to determine the management information obtained by summarizing a plurality of the management information pieces or selected from among the plurality of the management information pieces in accordance with a predetermined rule to be the management information to be transmitted by the second radio communication scheme.

6. A transmission system comprising:
a radio transmission apparatus; and
a management apparatus configured to remotely managing the radio transmission apparatus, wherein
the radio transmission apparatus comprises:
a first radio communication circuit configured to perform radio communication by a first radio communication scheme;
a second radio communication circuit configured to perform radio communication by a second radio communication scheme;
at least one memory storing program instructions; and
at least one processor configured to execute the instructions stored in the memory to:
determine whether an abnormality has occurred in the radio communication performed by the first radio communication circuit; and
control transmission and reception of management information about the radio transmission apparatus using the first radio communication circuit or the second radio communication circuit, and
the processor is further configured to execute the instructions to perform control so that the management information is transmitted and received by using the second radio communication circuit when it is determined that an abnormality has occurred in the radio communication performed by the first radio communication circuit, and the radio transmission apparatus and the management apparatus transmit and receive the management information to and from each other without performing communication by the first radio communication scheme.

7. The transmission system according to claim 6, wherein the second radio communication scheme is a radio communication scheme having a wider communication range than that of the first radio communication scheme.

8. A transmission method comprising:
determining, in a radio transmission apparatus comprising a first radio communication circuit for performing radio communication by a first radio communication scheme and a second radio communication circuit for performing radio communication by a second radio communication scheme, whether an abnormality has occurred in the radio communication performed by the first radio communication circuit; and
performing control so that management information about the radio transmission apparatus is transmitted and received to and from a predetermined apparatus by using the second radio communication circuit when it is determined that an abnormality has occurred in the radio communication performed by the first radio communication circuit,
wherein the predetermined apparatus is a management apparatus configured to remotely manage the radio transmission apparatus, or a relay apparatus configured to relay transmission and reception of the management information between the radio transmission apparatus and the management apparatus by a communication scheme other than the first radio communication scheme.

* * * * *